Nov. 21, 1944.  M. E. BIXLER  2,363,385
REFRIGERATION
Filed June 17, 1939  2 Sheets-Sheet 1

INVENTOR
Milo E. Bixler
BY
Harry S. DuMarse
ATTORNEY

Nov. 21, 1944.　　　M. E. BIXLER　　　2,363,385
REFRIGERATION
Filed June 17, 1939　　2 Sheets-Sheet 2

INVENTOR
Milo E. Bixler
BY
Harry S. Dumars
ATTORNEY

Patented Nov. 21, 1944

2,363,385

UNITED STATES PATENT OFFICE 2,363,385

REFRIGERATION

Milo E. Bixler, North Canton, Ohio, assignor to The Hoover Company, North Canton, Ohio, a corporation of Ohio Application June 17, 1939, Serial No. 279,609

26 Claims. (Cl. 62—119.5)

This invention relates to the art of refrigeration and more particularly to a novel absorption refrigerating system of the three-fluid type embodying an evaporator which is characterized in that it provides an ice making compartment, a meat storage chamber and a large cabinet cooling capacity in a very compact and efficient construction.

It is a principal object of the present invention to provide a three-fluid absorption refrigerating system embodying an evaporator which may be positioned at a relatively low elevation within the storage compartment of the refrigerator without wasting any otherwise usable space in this compartment and which performs a plurality of distinct refrigerating functions in a highly efficient manner.

It is a further object of the present invention to provide an absorption refrigerating system including an evaporator in which there is provided an insulated ice freezing chamber surrounded on a plurality of sides by a decorative and shielding casing which also serves as a highly efficient storage compartment refrigerating element and which is constructed and arranged to refrigerate a superposed removable drawer peculiarly adapted for efficient refrigerator of meat and similar substances.

It is another object of the present invention to provide an absorption refrigerating system including an evaporator which is constructed and arranged to refrigerate a food storage compartment which is positioned in space otherwise not usable within the storage compartment of refrigerating apparati.

It is a further object of the present invention to provide a refrigerating apparatus including a cooling unit which is arranged to include a plurality of air cooling flues without appreciably increasing the bulk of the evaporator over standard designs.

It is another object of the present invention to provide a refrigerating apparatus including a cooling unit constructed and arranged to refrigerate an enclosed food chamber which is positioned out of the normal air flow path in the refrigerating cabinet and in space not normally usable.

It is a still further object of the present invention to provide a cooling unit having an ice freezing section which is partially embraced by vertically coextensive air cooling sections arranged to provide efficient air cooling with minimum space utilization in the apparatus.

Other objects and advantages of the invention will become apparent as the description proceeds when taken in connection with the accompanying drawings in which.

Figure 1:
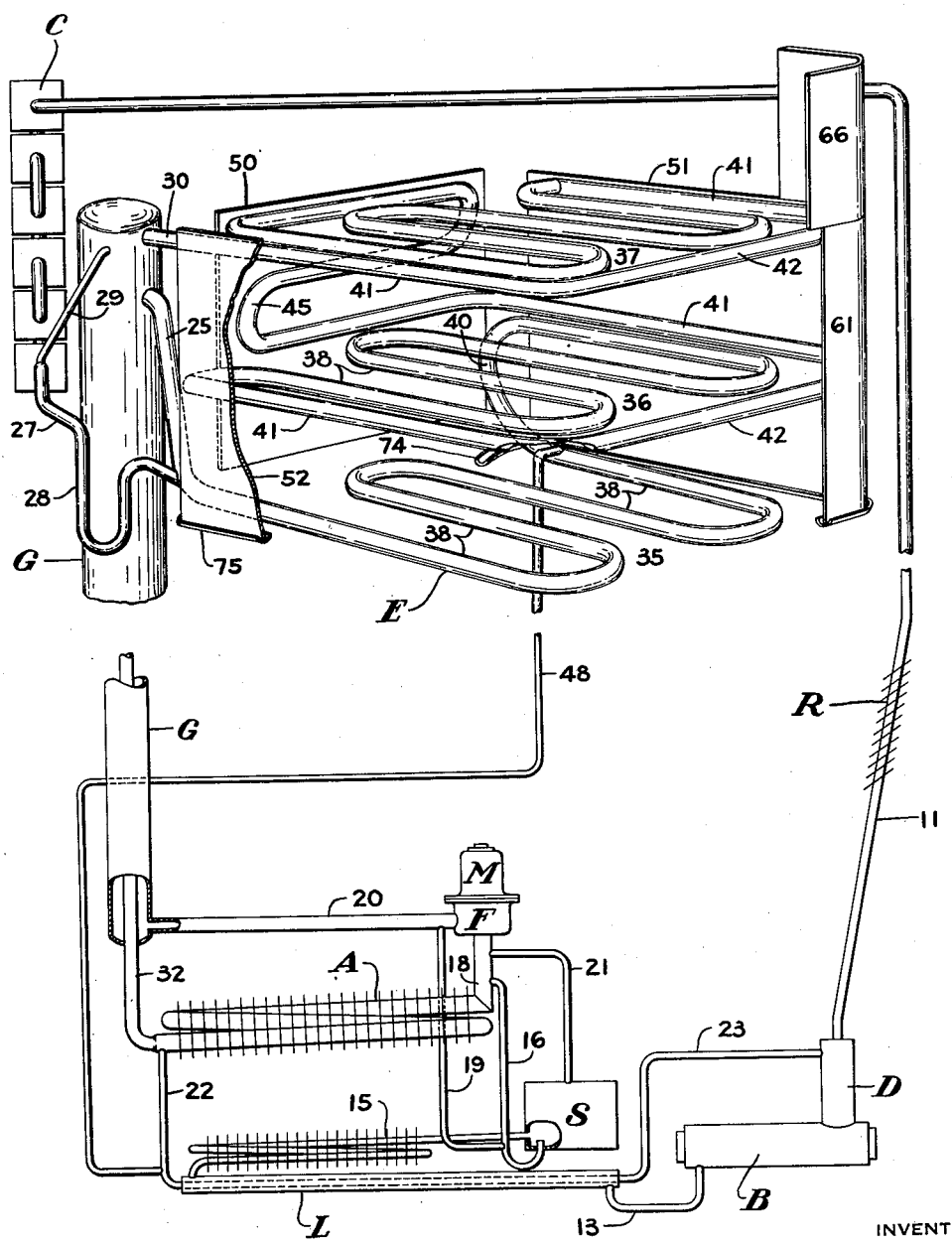
Figure 1 is a diagrammatic representation of a three-fluid absorption refrigerating system embodying the present invetnion and in which parts of the apparatus are shown on an enlarged scale and in perspective.

Referring now to the drawings in detail and first to Figure 1 thereof, there is disclosed a three-fluid absorption refrigerating apparatus embodying a boiler B, an analyzer D, an air-cooled rectifier R, a tubular air-cooled condenser C, an evaporator E, a gas heat exchanger G, a tubular air-cooled absorber A, a liquid heat exchanger L, a solution reservoir S, and a circulating fan F which is driven by an electrical motor M. These elements are suitably connected by various conduits to form a three-fluid absorption refrigerating system including a plurality of gas and liquid circuits to which reference will be made in more detail hereinafter.

The above described system will be charged with a suitable refrigerant, such as ammonia, a suitable absorbent therefor, such as water, and an inert pressure equalizing medium, preferably a dense inert gas like nitrogen.

The boiler B may be heated in any suitable manner as by a combustible fuel burner or an electrical cartridge heater.

The application of heat to the boiler B generates refrigerant vapor from the storage solution normally therein contained. The vapors so generated together with vapor of absorption solution also liberated in the boiler pass upwardly through the analyzer D in counterflow relationship with strong solution flowing downwardly therethrough. In the analyzer further refrigerant vapor is generated from the strong solution by the heat of condensation of the aforementioned absorption solution vapor. The refrigerant vapor is then conducted from the upper portion of the analyzer D to the upper portion of the air-cooled condenser C by means of the conduit 11 which includes the air-cooled rectifier R. The rectifier R serves to condense vapor of absorption solution which may succeed in passing through the analyzer uncondensed.

The weak solution formed in the boiler B by the generation of refrigerant vapor therefrom is conveyed from the boiler to the solution reservoir S by means of the conduit 13, the liquid heat exchanger L, and a conduit 15 which includes a loped finned portion to serve as solution precooler.

The solution is conveyed from the bottom portion of the solution reservoir S into the upper portion of the absorber A by means of the gas lift pump 16 which is appropriately connected between the bottom portion of the reservoir and the gas discharge conduit 18 of the absorber A. The reservoir S is vented to the suction conduit 18 by a vent pipe 21. Pumping gas is supplied to the lower portion of the gas lift pump 16 below the liquid level normally therein contained by means of a conduit 19 which receives gas from the discharge conduit 20 of the circulating fan F. By this arrangement of the pump it is connected directly across the circulating fan which tends to stabilize the operation thereof due to the substantially stable conditions across the fan. Also the maximum pressure differential found in the system is available to operate the gas lift pump.

The lean solution which is supplied to the absorber through the conduit 16 flows downwardly therethrough by gravity in counterflow relationship to a rich mixture of inert gas and refrigerant vapor which is conveyed from the evaporator to the bottom portion of the absorber. The refrigerant vapor content of the mixture is absorbed by the absorbing solution in the absorber and the resulting heat of absorption is rejected to cooling air flowing over the exterior walls of the absorber and the fins attached thereto.

The strong solution which is formed in the absorber flows to the bottom portion thereof from which point it is conveyed to the upper portion of the analyzer D by way of the conduit 22, the liquid heat exchanger L, and the conduit 23, thus completing the absorption solution circuit.

The lean inert gas refrigerant vapor mixture formed in the absorber A is conveyed from the upper portion thereof to the suction side of the circulating fan F by means of the conduit 18. The circulating fan then places the lean gas under a pressure of a few inches of water and it is conveyed from the discharge side of the circulating fan to the bottom portion of the evaporator E by means of the conduit 20, the gas heat exchanger G and an evaporator inlet conduit 25.

The exact construction and operation of the evaporator need not be discussed in detail at this point though the same will be described in detail hereinafter. For the present it is sufficient to note that the refrigerant vapor supplied to the condenser C is liquefied therein and is then conveyed from the bottom portion of the condenser C to the bottom portion of the lean gas inlet conduit 25 adjacent its point of connection with the bottom portion of the evaporator E by means of a conduit 27 which includes a downwardly extending U-shaped portion 28 which forms a liquid seal between the evaporator and condenser and also forms a pressure balancing liquid column in a manner to be described more fully hereinafter. The condenser side of the U-shaped trap 28 is vented to the rich gas side of the gas heat exchanger by a vent pipe 29. For the present it is sufficient to note that the inert gas travels through the evaporator at a velocity sufficient to propel the liquid refrigerant through all portions thereof from the bottom to the top, respectively, as the liquid is evaporating into the inert gas to produce the refrigerating effect.

The resulting rich mixture of pressure equalizing medium and refrigerant vapor is then discharged from the upper portion of the evaporator E to the gas heat exchanger G by means of a conduit 30. After traversing the gas heat exchanger G the rich gas is conveyed by means of the conduit 32 to the bottom portion of the absorber through which it flows upwardly counter to the absorption solution in the manner heretofore described, thus completing the inert gas circuit.

Referring now to the evaporator E in detail it will be seen that the same comprises three vertically spaced parallel horizontal coil sections 35, 36 and 37. Each of these sections is formed of a pair of rearwardly directed U-shaped conduits 38, the inner adjacent legs of which are serially connected at their rear ends. A suitable riser conduit 40 serially connects the coil sections 35 and 36.

In addition to the rearwardly directed U-shaped conduits 38 the coil sections 36 and 37 also include outwardly spaced conduits 41 which are serially connected across the front by a cross-connecting conduit 42. As illustrated the portion of the coil section 36 remote from the riser conduit 40 is connected at its rear end to the left hand conduit section 41, as viewed in Figure 1, and the right-hand end of the coil section 37 is connected to the right hand end of the conduit 41 which is coplanar therewith. The left hand conduit 41 coplanar with the coil section 37 joins the rich gas discharge conduit 30.

The rear end portion of the right hand conduit 41 coplanar with the coil section 36 connects to a vertically reversely bent coil section 45 which is positioned at the rear of the evaporator and joins the rear left hand leg of the top coil section 37.

The distance between the coil sections 36 and 37 is greater than the distance between the coil sections 35 and 36 in order to provide for two single depth or a single double depth ice tray between the coil sections 36 and 37. It is for this reason that the coil sections 36 and 37 are serially connected by the double lift riser 45 rather than a single lifting riser such as 40.

An overflow and anti-blockage drain 48 is connected between the rich solution return conduit 22 and the top portion of the coil section 35 adjacent its point of connection with the riser conduit 40.

A single vertical box-cooling plate 50 is suitably attached to the riser conduit 45 as by tinning, welding, brazing, or the like. Likewise a box-cooling plate 51 is similarly attached to the conduit 41 on the right hand side of the evaporator and a plate 52 is similarly attached to the conduit 41 on the left hand side of the evaporator, thereby providing three box-cooling plates 50, 51 and 52, respectively. Only a small portion of the plate 52 is shown in order not to interfere with the illustration of the coil sections. It will be understood, however, that the same is coextensive with the plate 51.

Figure 2:
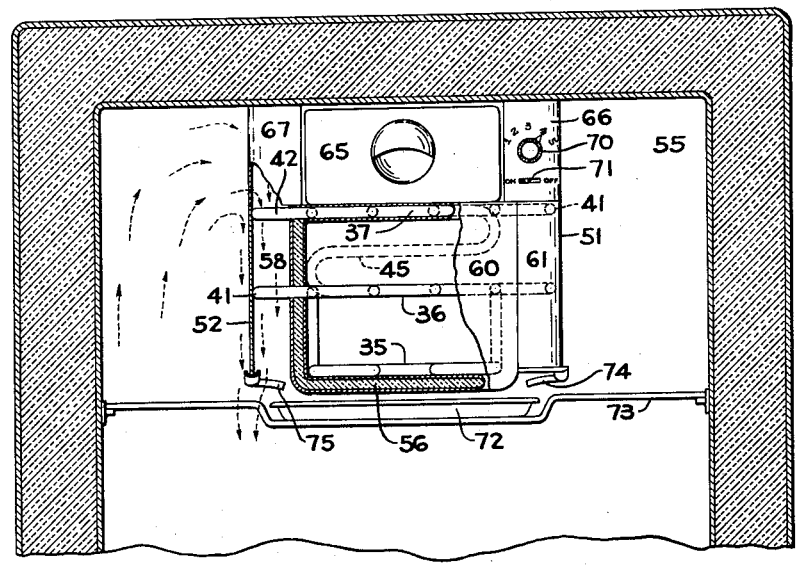
Figure 2 is a partial sectional elevational view of a cabinet embodying the present invention.

Referring now to Figure 2, the arrangement of the evaporator and its associated casings within the cabinet will be described. It will be understood that the evaporator will be mounted within a suitable insulated refrigerating storage compartment 55. As shown, the horizontal coil sections 35 and 36 are encased within an insulated ice-freezing compartment 56. The coil section 37 lies in the top portion of the compartment 56 but is not insulated. The conduit sections 41 extend longitudinally along each side of the insulated casing 56 in spaced relationship thereto whereby the box-cooling plates 51 and 52 which are carried by the conduits 41 form air cooling ducts 58 on each side of the ice-freezing compartment 56.

If desired, suitable shelves, not shown, may be placed upon the coil sections 35 and 36 in order to provide smooth, uninterrupted supports for ice trays.

The riser conduit 45 and its associated panel 50 will be spaced rearwardly from the rear insulated wall of the compartment 56 in order to provide an air-cooling flue between the rear wall of the cabinet 55 and freezing chamber 56. The cross-connecting conduits 42 will lie within the insulated chamber 56 beneath the ice tray supporting shelves. A suitable door, which may be insulated or not as desired, is provided at 60 to provide access to the interior of the chamber 56.

The box-cooling panels 51 and 52 are bent around the front portion of the conduit 41 as indicated at 61 and join the side walls of the chamber 56 whereby the box-cooling coils 41 are hidden from view.

As is apparent from Figure 2, the top portion of the evaporator casing is spaced an appreciable distance below the top wall of the storage chamber 55. This space is partially occupied by a slidably supported removable meat storage drawer 65 which rests upon the top wall of the casing 56 and is refrigerated by means of the coil section 37 of the evaporator which is positioned directly beneath such top wall. The box-cooling panels 50, 51 and 52 terminate short of the top wall of the storage compartment 55 at approximately the level of the top wall of the casing 56, whereby the air within the storage compartment may rise along the outer walls thereof and then drop downwardly on each side of the panels 50, 51 and 52 as it is being refrigerated thereby. The path of the air is shown by the arrows.

Small L-shaped panels 66 and 67 are mounted at the right and left hand sides respectively, as viewed in Figure 2, of the drawer 65 in order to shield the side walls of the drawer and the upper portions of the flues 58 from view. The L-shaped panels 66 and 67 may be secured to the apparatus in any suitable manner. The panel 67 is broken away in Figure 2 in order to illustrate the open top portion of the flue 58.

As is illustrated in Figure 2, the adjustment 70 for the control and the defrosting button 71 are mounted on the panel 66 and have appropriate connections running to the rear of the cabinet for controlling the operation of the apparatus. If desired, the button 71, for example, could be mounted upon the panel 67.

The bottom edges of the panels 51 and 52 are tapered downwardly to the rear and are provided with drip troughs 74 and 75, respectively, which are turned inwardly at their rear ends to terminate over a drip tray 72 which is carried on a suitable shelf 73. This permits the tray 72 to be narrower than the distance between the panels 51 and 52 whereby it does not interfere with the air bow between the panels and the housing 56.

The herein disclosed evaporator is of the type which is constructed of relatively small diameter tubing whereby the inert gas travels therethrough at a velocity high enough to sweep or drag the liquid refrigerant through all portions of the evaporator as it is evaporating into the gas. It will be noted that the inert gas and liquid refrigerant first traverse the coil section 35, then the coil section 36, then the conduits 41 and 42 associated with the coil section 36, then the riser conduit unit 45, the coil section 37 and finally the conduits 41 and 42 associated with the coil section 37. In this way refrigeration is first produced in the coil sections 35 and 36 which carry the major ice freezing load and which should be at the lowest temperature found in the apparatus. Thereafter the refrigerating effect is produced in the box-cooling coils and in the coil section 37 which serves to refrigerate the removable drawer 65.

The above described evaporator combines in a single highly compact unit having a minimum vertical height, ice freezing, box-cooling and moderate temperature refrigerating storage with a most efficient utilization of space within the storage compartment.

One of the serious difficulties of previous refrigerant constructions has arisen from the fact that the evaporator as a whole was excessively high, thus imposing a very great lifting load upon the inert gas in the case of systems in which the inert gas propels the liquid refrigerant upwardly through the evaporator and requiring either a very uneconomical utilization of the space within the storage compartment or the use of a condenser extending high above the normal top wall of the storage compartment in the case of evaporators of the type in which the liquid refrigerant flows therethrough by gravity. Moreover, it has heretofore been customary to place the box-cooling portion of the evaporator above the ice freezing section thereof. This was highly inefficient in the case of the gravity type evaporator from a thermodynamic standpoint, was uneconomical of space and did not efficiently cool the air within the storage compartment because of the interference to air flow naturally offered at this point by the ice freezing compartment.

The present invention overcomes these difficulties by providing an arrangement in which a very large box-cooling area is provided within the same height as that normally occupied by the ice freezing section of the evaporator and one which adds only a very small amount to the lateral dimensions of the evaporator. In addition, the space normally utilized above the ice-freezing portion of the evaporator for the purposes of box-cooling is efficiently utilized by means of a refrigerated storage drawer in accordance with the present invention.

A further important feature of this arrangement is that the storage drawer is out of the path of flow of the air in the cabinet and is not in a position in which evaporator drippage can fall thereon. The humidity and air circulation within the drawer can be regulated by suitable louvres if desired. The arrangement of the drawer is such that it is maintained at an optimum temperature for the storage of foods, such as meat, which require lower temperatures than other foodstuffs. Furthermore, temperature fluctuations in the drawer may be substantially minimized by constructing the drawer from material having a high heat capacity such as annealed glass. All these factors combine to produce a highly efficient and satisfactory meat storage space without imposing any detriments on other parts of the apparatus.

In accordance with the present invention very efficient box-cooling is achieved by reason of the very large plates 50, 51 and 52 which are secured to the evaporator and spaced laterally therefrom and which also lie in vertical planes whereby the air stream flows downwardly on both sides thereof. These plates have a very large area with respect to the area of the refrigerating conduits to which they are directly attached whereby they are able to conduct the heat to the refrigerating conduits from a large area and thereby substantially minimize the deposition of frost.

With the evaporator arrangement herein disclosed the coil sections 35 and 36, which carry the major portion of the ice freezing load, are completely housed in an insulated casing whereby the air within the food storage compartment never comes into contact with the extremely low temperature portions of the evaporator, which is a further factor materially tending to minimize frost deposition.

It will be understood that the cabinet 55 will include a suitable lower mechanism compartment and rear air cooling flue for housing the boiler analyzer, absorber and condenser assembly in appropriate locations.

Figure 3:
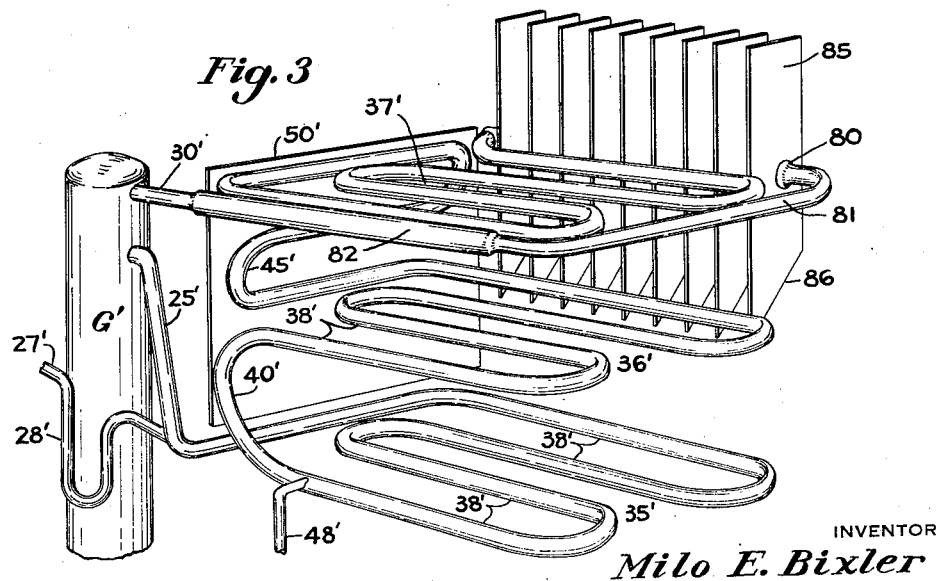
Figure 3 is a fragmentary diagrammatic representation in perspective of a modified form of the present invention.

Referring now to Figure 3 there is disclosed a modified form of the invention. This form of the invention is designed and intended to be utilized with a refrigerating system identical with that disclosed in connection with Figure 1. Therefore, it has not been deemed necessary to repeat the illustration of the solution circuit and the portions of the inert gas circuit directly associated therewith. Certain portions of the apparatus illustrated in Figure 3 are identical with apparatus previously illustrated and described in connection with Figures 1 and 2 and are therefore given the same reference characters primed.

This form of the invention is also designed to be used with an ice freezing chamber and a superposed refrigerated drawer. However, as these are identical with the disclosure of Figures 1 and 2 they have not been illustrated. Only the evaporator coils, their connections and associated structure differ from Figures 1 and 2 and only these have been illustrated in Figure 3.

The evaporator of Figure 3 comprises coil sections 35', 36' and 37' corresponding to the coil sections 35, 36 and 37 previously described except that the inlet and outlet ends thereof are reversed; that is, the conduit 25' extends across the rear of the evaporator and joins the right hand end of the coil 35' instead of connecting directly to the left hand end of the coil 35' in the manner in which the conduit 25 joins the coil section 35.

In this form of the invention there are no conduits 41 and 42 in the plane of the coil section 36. The right hand end or outlet portion of the coil section 37' joins an enlarged diameter conduit 80 which extends forwardly of the evaporator at which point it joins a smaller diameter cross connecting conduit 81 which in turns enjoins a rearwardly extended second enlarged diameter conduit 82 which ultimately connects to the inert gas discharge conduit 30'.

The conduits 80 and 82 are each provided with a plurality of vertically extending air cooling fins 85, though only those fins associated with the conduit 80 have been illustrated in order that the construction of the coil may be seen clearly. The lower ends of the fins 85 are beveled inwardly toward the evaporator, as indicated at 86, in order that drippings therefrom may be discharged downwardly adjacent the wall of the evaporator into a suitable subjacent drip collecting tray such as the tray 72 illustrated in Figure 2.

The conduits 80 and 82 are of enlarged diameter in order to provide a relatively large circle of contact between these conduits and associated air cooling fins. Preferably the diameter of the conduits 80 and 82 is not so large that the inert gas will not propel the liquid refrigerant therethrough even though it be at a slower rate than the rate of flow of the liquid through other portions of the evaporator. However, if the diameter of these conduits is made so large that the inert gas will not propel the liquid refrigerant therethrough they could be given a slight slope in order that the liquid may flow therethrough by gravity.

It will be understood that the coil sections 35', 36' and 37' will be encased in a suitable insulated housing such as that illustrated at 56 in Figure 2 and that a suitable refrigerated storage drawer will rest upon the top portion of the casing to be refrigerated by the coil section 37'.

This form of the invention is simpler than that described in connection with Figures 1 and 2 and need not use the outer casing structure described in connection with Figures 1 and 2. It is preferred to use shields such as those indicated at 61, 66 and 67 in Figures 1 and 2 to hide the fins from view. If desired panels such as those indicated at 51 and 52 in Figure 1 may be bonded to the outer edges of the fins 85 to form flues and to increase the air cooling capacity of the apparatus.

The box-cooling capacity of the evaporator of Figure 3 is somewhat less than that disclosed in connection with Figures 1 and 2 by reason of the fact that no box-cooling conduits are associated with the coil section 36', though this is a matter principally important with relation to the size of the cabinet with which the evaporator is to be associated.

The control mechanism may be mounted on a panel as illustrated in Figure 2 in which event the connections for the regulating dial 70 and the defrosting dial 71 will pass through a suitable opening in the fins.

This form of the invention, like that described in connection with Figures 1 and 2, also provides an evaporator having ice-freezing sections located within an insulated compartment, box-cooling sections without the insulated compartment, and a refrigerated storage drawer in heat exchange relationship with the topmost cooling section located within the ice-freezing compartment.

Though the invention has been illustrated and described in appreciable detail, various changes may be made in the proportion, arrangement, and construction of parts without departing from the spirit of the invention or the scope of the appended claims.

I claim:

1. Refrigerating apparatus including, an evaporator having a plurality of horizontal serially connected shelf-like coils, an insulated housing encasing one of said shelf-like coils, another of said shelf-like coils being mounted in the top wall of said housing, a refrigerator drawer slidably mounted on the top of said housing in heat exchange relationship with said coil in the top wall of said housing, means for supplying a refrigerant to said evaporator, and means for propelling an inert gas through said evaporator with a velocity sufficient to propel the refrigerant therethrough.

2. Refrigerating apparatus including, an evaporator having a plurality of horizontal serially connected shelf-like coils, an insulated housing encasing one of said shelf-like coils, another of said shelf-like coils being mounted in the top wall of said housing, a refrigerator drawer slidably mounted on the top of said housing in heat exchange relationship with said coil in the top wall of said housing, a space cooling conduit positioned laterally of said coils and serially connected thereto, means for supplying a refrigerant to said evaporator, and means for propelling an inert gas through said evaporator with a velocity sufficient to propel the refrigerant therethrough.

3. Refrigerating apparatus including, an evaporator having a plurality of horizontal serially connected shelf-like coils, an insulated housing encasing one of said shelf-like coils, another of said shelf-like coils being mounted in the top wall of said housing, a refrigerator drawer slidably mounted on the top of said housing in heat exchange relationship with said coil in the top wall of said housing, a pair of space cooling conduits positioned on opposite sides of said coils and serially connected thereto, means for supplying a refrigerant to said evaporator, and means for propelling an inert gas through said evaporator with a velocity sufficient to propel the refrigerant therethrough.

4. Refrigerating apparatus including, an evaporator having a plurality of horizontal serially connected shelf-like coils, an insulated housing encasing one of said shelf-like coils, another of said shelf-like coils being mounted in the top wall of said housing, a refrigerator drawer slidably mounted on the top of said housing in heat exchange relationship with said coil in the top wall of said housing, a pair of space cooling conduits positioned on opposite sides of said coils and serially connected thereto, air cooling heat transfer means thermally attached to said space cooling conduits, means for supplying a refrigerant to said evaporator, and means for propelling an inert gas through said evaporator with a velocity sufficient to propel the refrigerant therethrough.

5. Refrigerating apparatus including, an evaporator having a plurality of horizontal serially connected shelf-like coils, an insulated housing encasing one of said shelf-like coils, another of said shelf-like coils being mounted in the top wall of said housing, a refrigerator drawer slidably mounted on the top of said housing in heat exchange relationship with said coil in the top wall of said housing, a pair of space cooling conduits positioned on opposite sides of said coils and serially connected thereto, a plurality of air cooling fins on said conduits, means for supplying a refrigerant to said evaporator, and means for propelling an inert gas through said evaporator with a velocity sufficient to propel the refrigerant therethrough.

6. Refrigerating apparatus including, an evaporator having a plurality of horizontal serially connected shelf-like coils, an insulated housing encasing one of said shelf-like coils, another of said shelf-like coils being mounted in the top wall of said housing, a refrigerator drawer slidably mounted on the top of said housing in heat exchange relationship with said coil in the top wall of said housing, a pair of space cooling conduits positioned on opposite sides of said coils and serially connected thereto, a pair of side panels spaced laterally of said housing to form air cooling flues therewith and thermally bonded to said conduits, means for supplying a refrigerant to said evaporator, and means for propelling an inert gas through said evaporator with a velocity sufficient to propel the refrigerant therethrough.

7. Refrigerating apparatus including, an evaporator having a plurality of horizontal serially connected shelf-like coils and a pair of space cooling conduits positioned on opposite sides of said coils and serially connected thereto, an insulated housing encasing one of said shelf-like coils, another of said shelf-like coils being mounted in the top wall of said housing, a refrigerator drawer slidably mounted on the top of said housing in heat exchange relationship with said coil in the top wall of said housing, a pair of side panels spaced laterally of said housing to form air cooling flues therewith and thermally bonded to said conduits, upstanding panels positioned laterally of said drawer and arranged to hide the spaces laterally of said drawer and above said flues, means for supplying a refrigerant to said evaporator, and means for propelling an inert gas through said evaporator with a velocity sufficient to propel the refrigerant therethrough.

8. Refrigerating apparatus comprising an insulated refrigerating compartment, a cooling unit in said compartment and below the top wall thereof, an insulated housing enclosing a portion of said cooling unit, a removable drawer positioned on top of said housing and in heat transfer relationship with another portion of the cooling unit, said cooling unit also including a portion positioned laterally of said housing to refrigerate the air in said compartment, and a combined air cooling and flue defining plate in heat transfer relationship with the laterally positioned portion of said cooling unit whereby to form an air passage between said housing and said plate.

9. Refrigerating apparatus comprising an insulated refrigerating compartment, a cooling unit in said compartment and below the top wall thereof, an insulated housing enclosing a portion of said cooling unit, a removable drawer positioned on top of said housing and in heat transfer relationship with another portion of the cooling unit, said cooling unit also including a portion positioned laterally of said housing to refrigerate the air in said compartment, and a combined air cooling and flue defining plate in heat transfer relationship with the laterally positioned portion of said cooling unit whereby to form an air passage between said housing and said plate, a panel positioned laterally of said drawer and above the front end of said flue, and control means for said cooling unit mounted on said panel.

10. Refrigerating apparatus comprising an insulated refrigerating compartment, a cooling unit in said compartment and below the top wall thereof, a housing enclosing said cooling unit, a removable drawer positioned on top of said housing and in heat transfer relationship with a portion of the cooling unit, air cooling means positioned laterally of said housing, a front panel positioned laterally of said drawer and above said air-cooling means, and control means for said cooling unit on said panel.

11. Refrigerating apparatus comprising a storage compartment, a cooling unit including a chilling section and a laterally positioned air cooling section mounted in said storage compartment, a housing enclosing said chilling section, an upstanding air cooling plate in heat transfer relationship with said air cooling section and spaced laterally of said housing to form an air passageway therewith, a drip tray beneath said cooling unit positioned so as not to interfere with air flowing through said passageway, and a drip trough on the lower end of said plate including a laterally extending portion terminating above said tray.

12. A chilling unit structure for refrigerating systems comprising an evaporator conduit shaped to form a plurality of superposed shelf-like coil portions each of which includes inner and outer conduit sections, an insulated freezing chamber housing the inner conduit sections of each of said coil portions, and upstanding panels spaced from said housing and in heat transfer relationship with the said outer conduit sections of at least one of said coil portions.

13. Absorption refrigerating apparatus comprising a solution circuit including a boiler and an absorber, a plurality of substantially horizontal shelf-like evaporator coils, space cooling evaporator conduits serially connected to the highest of said coils and positioned laterally thereof, means serially connecting the highest of said coils to a lower one of said coils including space cooling evaporator conduits positioned laterally of said coils beneath said first mentioned space cooling conduits and an upstanding evaporator conduit positioned rearwardly of said coils, an insulated storage chamber receiving said shelf-like coils, air cooling heat transfer plates spaced from said storage chamber and in heat transfer relationship with said space cooling conduits and said upstanding conduit, means for liquefying refrigerant vapor produced in said boiler and for supplying the same to the lowest of said coils, and means for propelling inert gas upwardly through said evaporator coils and conduits under conditions such that it carries the refrigerant upwardly therethrough as it is evaporating whereby the refrigerant and the inert gas traverse the lowest of said coils before reaching said space cooling conduits and said top coil.

14. Absorption refrigerating apparatus comprising a solution circuit including a boiler and an absorber, a plurality of substantially horizontal shelf-like evaporator coils, space cooling evaporator conduits serially connected to the highest of said coils and positioned laterally thereof, means serially connecting the highest of said coils to a lower one of said coils including space cooling evaporator conduits positioned laterally of said coils beneath said first mentioned space cooling conduits and an upstanding conduit positioned rearwardly of said coils, an insulated ice freezing housing receiving the lower of said horizontal coils and receiving said highest coil in its top wall, air cooling heat transfer plates positioned in spaced relationship with said housing and thermally bonded to said laterally positioned space cooling conduits, said heat transfer plates having the front edges thereof turned inwardly to said housing, a heat transfer plate attached to said upstanding conduit, a slidable foodstuffs drawer mounted on the top wall of said housing and in heat transfer relationship with said highest coil, means for liquefying refrigerant vapor produced in said boiler and for supplying the same to the lowest of said coils, and means for propelling the inert gas upwardly through said evaporator under conditions such that it carries the refrigerant upwardly therethrough as it is evaporating whereby the refrigerant and the inert gas traverse the lowest of said coils before reaching said space cooling conduits, said upstanding conduit and said top coil.

15. Refrigerating apparatus comprising a cabinet structure having an insulated cooling chamber, an ice freezing chamber housing adapted to receive ice freezing trays positioned within said chamber adjacent the upper central portion thereof, upstanding air cooling plates positioned laterally of and in spaced relationship with said housing to form cooling air flues on opposite sides thereof, a food stuffs refrigerating drawer slidably mounted in vertical alignment with said housing and a refrigerating element arranged to refrigerate said housing, said upstanding air cooling plates and drawer.

16. In a refrigerator, a cabinet structure forming an insulated refrigerating chamber, an insulated freezing compartment mounted in said chamber, an absorption refrigerating apparatus associated with said cabinet structure and said compartment comprising a generator, a condenser connected to receive refrigerant vapor from said generator, an evaporator connected to receive refrigerant liquid from said condenser, a first section of said evaporator being arranged within said compartment to refrigerate the same, a second section of said evaporator being positioned laterally of said compartment for refrigerating the air in said chamber, and means for propelling an inert gas through said evaporator sections, said apparatus being so constructed and arranged that the refrigerant liquid is propelled through said first and second evaporator sections in the order named.

17. Refrigerating apparatus comprising an evaporator including a freezing section and a chilling section, an insulated housing having an uninsulated wall enclosing said freezing section and said chilling section, said chilling section being arranged to refrigerate said uninsulated wall, means for forming a foodstuffs refrigerating chamber movably mounted adjacent said housing and arranged to be refrigerated by said chilling section by heat conduction through a wall of said housing, and means for supplying a refrigerant to said evaporator.

18. Refrigerating apparatus comprising an insulated cabinet structure having a refrigerating chamber, an evaporator in said chamber including a freezing section and a chilling section, a housing enclosing said freezing section and said chilling section, means forming a foodstuffs refrigerating chamber arranged to be refrigerated by said chilling section by heat conduction through a wall of said housing, a space cooling evaporator section positioned laterally of one of said first mentioned sections for refrigerating the air in said chamber, and means for supplying a refrigerant to said evaporator.

19. Absorption refrigerating apparatus comprising a generator, a condenser, an evaporator, an absorber, means connecting said generator and said absorber for circulation of absorption solution therebetween, means connecting said absorber and said evaporator for circulation of inert gas therebetween, means for supplying refrigerant vapor produced in said generator to said condenser, means for supplying refrigerant liquid from said condenser to said evaporator, said evaporator including a plurality of sections, a housing enclosing said evaporator sections and having all but one wall insulated, one of said evaporator sections being arranged to refrigerate said one wall of said housing and a movable refrigerating container mounted exteriorly of said housing and arranged to be refrigerated through said one wall of said housing.

20. Absorption refrigerating apparatus comprising a generator, a condenser, an evaporator, an absorber, means connecting said generator and said absorber for circulation of absorption solution therebetween, means connecting said absorber and said evaporator for circulation of inert gas therebetween, means for supplying refrigerant vapor produced in said generator to said condenser, means for supplying refrigerant liquid from said condenser to said evaporator, said evaporator including a plurality of sections, a housing enclosing said evaporator sections and having all but one wall insulated, one of said evaporator sections being arranged to refrigerate said one wall of said housing, and a movable refrigerating container mounted exteriorly of said housing and arranged to be refrigerated through said one wall of said housing, said apparatus being so constructed and arranged that the inert gas flows from said absorber to said evaporator and flows through the section of said evaporator which refrigerates said one wall after it has passed through the other of said plurality of sections.

21. Absorption refrigerating apparatus comprising a generator, a condenser, an evaporator, an absorber, means connecting said generator and said absorber for circulation of absorption solution therebetween, means connecting said absorber and said evaporator for circulation of inert gas therebetween, means for supplying refrigerant vapor produced in said generator to said condenser, means for supplying refrigerant liquid from said condenser to said evaporator, said evaporator including a plurality of sections, an insulated freezing housing enclosing some of said evaporator sections, other of said evaporator sections being positioned laterally of and in spaced relation to said housing, heat conducting means having a large surface thermally bonded to said laterally positioned sections to provide said sections with large air cooling surfaces.

22. Absorption refrigerating apparatus comprising a generator, a condenser, an evaporator, an absorber, means connecting said generator and said absorber for circulation of absorption solution therebetween, means connecting said absorber and said evaporator for circulation of inert gas therebetween, means for supplying refrigerant vapor produced in said generator to said condenser, means for supplying refrigerant liquid from said condenser to said evaporator, said evaporator including a plurality of sections, an insulated freezing housing enclosing some of said evaporator sections, other of said evaporator sections being positioned laterally of and in spaced relation to said housing, heat conducting means having a large surface thermally bonded to said laterally positioned sections to provide said sections with large air cooling surfaces, said apparatus being so constructed and arranged that the inert gas flows through at least one section of said evaporator within said housing before the inert gas flows through said laterally positioned sections.

23. A chilling unit construction for refrigerating systems comprising an insulated ice freezing chamber housing having an uninsulated wall, a movable foodstuffs refrigerating drawer mounted adjacent the uninsulated wall of said housing, a cooling unit including a low temperature coil within said housing for refrigerating the interior thereof and a high temperature coil in contact with said uninsulated wall for cooling said movable drawer, and means for leading refrigerant from said low temperature coil to said high temperature coil.

24. A refrigerating unit construction for refrigerating systems comprising an ice freezing chamber forming housing adapted to receive ice freezing trays, a movable foodstuffs refrigerating drawer slidably supported on the top wall of said housing and in heat exchange relationship therewith, said housing being insulated except for the top wall thereof, and a cold producing unit including a low temperature part arranged to refrigerate said housing and a high temperature part arranged to refrigerate said foodstuffs refrigerating drawer through the top wall of said housing.

25. In an absorption refrigerating apparatus, a condenser, an absorber, a low temperature evaporating conduit having portions lying in a horizontal plane adapted to underlie and support a freezing receptacle, a high temperature evaporating conduit positioned around and in spaced relationship to said low temperature evaporator conduit to form an air cooling unit, heat conducting means in heat exchange relationship with said high temperature evaporating conduit, means for supplying refrigerant liquid from said condenser to said evaporating conduits, means for supplying an inert gas from said absorber to said low temperature evaporating conduit, and means for conveying a mixture of gaseous refrigerant and inert gas from said low temperature evaporating conduit to said high temperature evaporating conduit.

26. In an absorption refrigerating apparatus, a condenser, an absorber, a low temperature evaporator tube having portions lying in a horizontal plane and adapted to underlie and support an ice tray, a casing forming a low temperature chamber, said evaporator tube being positioned within said chamber to refrigerate the interior thereof, a high temperature evaporator tube arranged exteriorly of said casing positioned around and in spaced relationship to said low temperature evaporator tube to form an air cooling unit, means for supplying refrigerant liquid from said condenser to said evaporator tubes, means for supplying inert gas from said absorber to said low temperature evaporator tube, and means for conveying a mixture of gaseous refrigerant and inert gas from said low temperature evaporator tube to said second evaporator tube.

MILO E. BIXLER.